J. W. HUNTER AND E. WILLIAMSON.
AUTOMOBILE LOCK.
APPLICATION FILED DEC. 15, 1919.
1,351,651.
Patented Aug. 31, 1920.
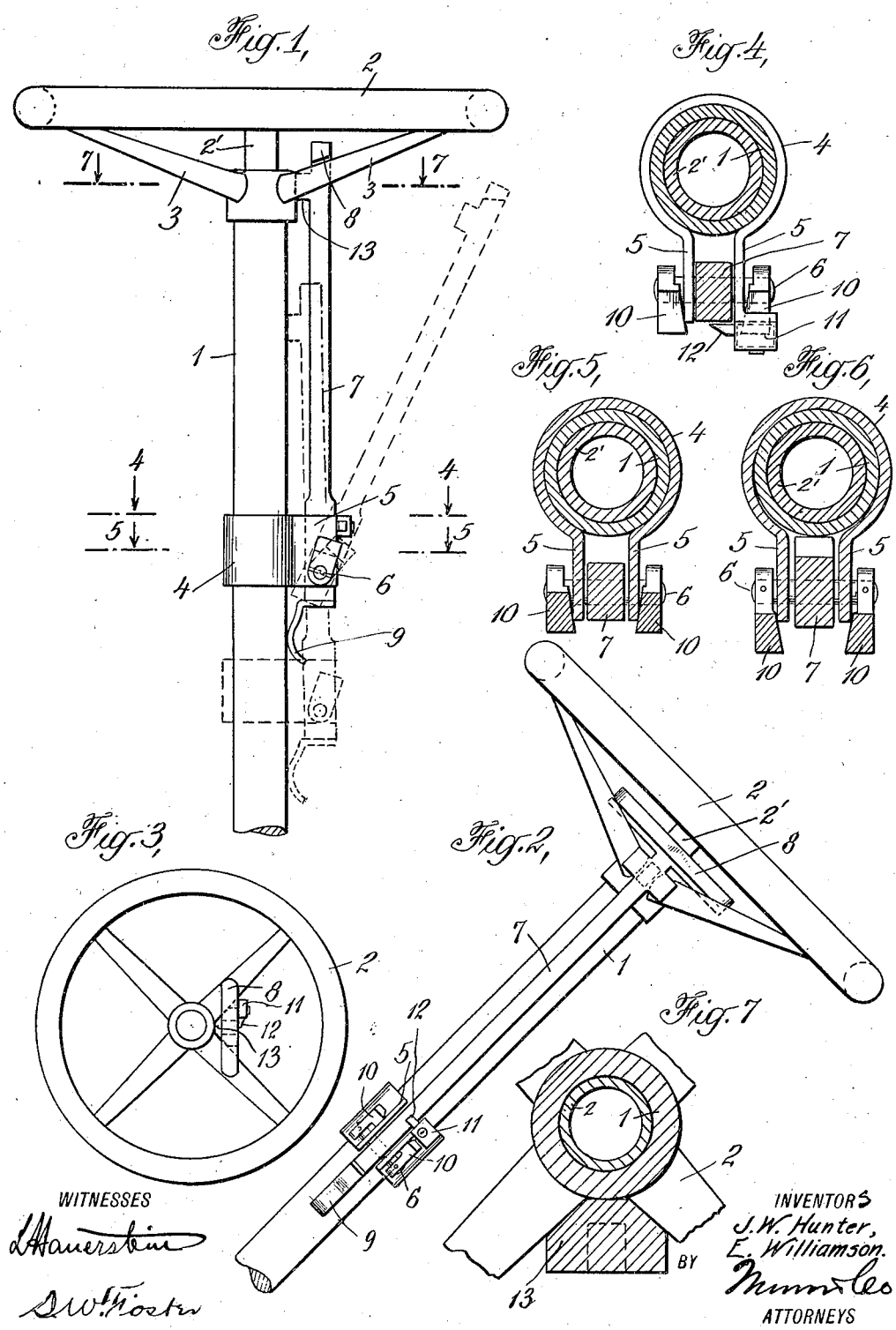

UNITED STATES PATENT OFFICE.

JAMES W. HUNTER, OF MOBILE, AND EDWIN WILLIAMSON, OF SELMA, ALABAMA.

AUTOMOBILE-LOCK.

1,351,651.   Specification of Letters Patent.   Patented Aug. 31, 1920.

Application filed December 15, 1919. Serial No. 345,022.

*To all whom it may concern:*

Be it known that we, JAMES W. HUNTER and EDWIN WILLIAMSON, citizens of the United States, and residents of Mobile, in the county of Mobile and State of Alabama, and Selma, in the county of Dallas and State of Alabama, have invented a new and Improved Automobile-Lock, of which the following is a full, clear, and exact description.

This invention relates to improvements in automobile locks, an object of the invention being to provide a lock or holding device which will prevent turning movement of the steering wheel and which can be readily moved from locking to unlocking position and vice versa, and securely lock when in position to hold the wheel.

A further object is to provide a device of the character stated, which can be readily positioned on the steering column, which will be out of the way when not in locking position, and which can be conveniently and quickly moved to hold the wheel and thus prevent steering of the automobile and consequent operation by any one except the rightful owner.

With these and other objects in view the invention consists in certain novel features of construction, and combinations and arrangements of parts, as will be more fully hereinafter described and pointed out in the claims.

In the accompanying drawings—

Figure 1 is a view in elevation illustrating our improvements;

Fig. 2 is a view in elevation at right angles to Fig. 1;

Fig. 3 is a top plan view;

Fig. 4 is a view in section on the line 4—4 of Fig. 1;

Fig. 5 is a view in section on the line 5—5 of Fig. 1;

Fig. 6 is a view similar to Fig. 5, showing the parts when the split collar is permitted to expand; and Fig. 7 is a fragmentary view in section on the line 7—7 of Fig. 1.

1 represents an ordinary steering column, 2 a steering wheel which is secured to the steering post 2′ in the column 2, and 3 the spokes of the steering wheel, these parts being such as are common on automobiles in general use. 4 represents a split spring collar which is positioned around the column 1 and may be conveniently located thereon when the steering wheel is removed. This split collar 4 is provided with a pair of perforated lugs 5 providing rotary mounting for a pivot pin 6, and 7 is a locking arm which is secured near its lower end to the pivot pin 6 and at its upper end is provided with a crossbar 8 adapted to engage over the upper faces of the spokes 3 when the upper end of the bar 8 is positioned between the spokes.

A spring tongue 9 is secured to the lower end of the arm 7 and bears against the steering column 1. This spring serves the double purpose of preventing rattling and also tends to return the arm 7 to a vertical position after it is swung to an angular position, as will more fully hereinafter appear.

A pair of cam blocks 10, 10, are secured on the ends of the pivot pin 6 and are made with transversely enlarged outer ends and with beveled or inclined cam faces adjacent the lugs 5. When the pivot pin 6 is turned in one direction, the cam faces engage the perforated lugs 5 so that when the arm 7 is moved to a vertical position, these cam blocks will move the perforated lugs 5 toward each other and clamp the collar 4 around the post 1.

A lock casing 11 is secured to one of the perforated lugs 5 and is provided with a locking bolt 12 which is adapted to be positioned in front of the arm 7 and secure the latter in its vertical position. This bolt 12 is operated by the proper key, not shown, which is in the possession of the owner of the car so that the arm 7 cannot be fraudulently moved. A lug 13 on the arm 7 limits the pivotal movement of the arm in one direction, as clearly shown in Fig. 1.

The operation is as follows: Normally the split collar is in the dotted line position shown in Fig. 1; that is to say, when the steering wheel is in use. When the car comes to rest and it is desired to lock the same, the arm 7 is swung outwardly at an angle to the dotted line position shown in Fig. 1, which releases the gripping action of the split collar 4 and allows the arm and split collar to be lifted. The upper end of the arm 7 is then moved inwardly between the spokes 3 with the crossbar 8 above the spokes, and the locking bolt 12 is operated by the proper key to secure the arm in this position.

When the arm 7 is swung to the vertical position, the cam blocks 10 operate to contract the collar 4 and grip the same around the post 1. When in this position, it is impossible to turn the steering wheel, and by reason of the crossbar it is impossible to force the arm 7 downwardly, which action is, of course, resisted by the split collar 4.

To release the holding device, it is necessary to use the proper key to withdraw the bolt 12 when the arm 7 can be swung to the dotted line position of Fig. 1, thus releasing the split collar 4 from its gripping action around the post 1 and the collar 4 and the arm can be moved downwardly and then the arm can be swung again to a vertical position, thereby clamping the collar around the post, and can be locked in this position by means of the bolt 12. As above stated, the spring tongue 9 tends to move the arm to a vertical position and also acts as an anti-rattler to prevent noise from vibrations to which it is necessarily subjected.

Various slight changes may be made in the general form and arrangement of parts described without departing from the invention, and hence we do not limit ourselves to the precise details set forth but consider ourselves at liberty to make such changes and alterations as fairly fall within the spirit and scope of the appended claims.

We claim:

1. A device of the character stated, comprising a split collar adapted to be positioned around a steering column, an arm pivotally connected to the collar, cam blocks operatively connected to the arm and engaging a split collar and adapted to contract the collar when the arm is in a vertical position, and said arm adapted, when moved to a vertical position, to be positioned between the spokes of the wheel.

2. A device of the character stated, comprising a split collar adapted to be positioned around a steering column, an arm pivotally connected to the collar, cam blocks operatively connected to the arm and engaging a split collar and adapted to contract the collar when the arm is in a vertical position, said arm adapted, when moved to a vertical position, to be positioned between the spokes of the wheel, a crossbar on the upper end of the arm adapted to engage over the upper faces of the spokes of the wheel, and means for locking the arm in vertical position.

3. A device of the character stated, comprising a split spring collar, an arm pivotally connected to the collar, cam blocks operatively connected to the arm and adapted to contract the collar when the arm is moved to a vertical position, said arm adapted, when in a vertical position, to be located between the spokes of a wheel, and means for locking the arm in said position.

4. A device of the character stated, comprising a split spring collar, an arm pivotally connected to the collar, cam blocks operatively connected to the arm and adapted to contract the collar when the arm is moved to a vertical position, said arm adapted, when in a vertical position, to be located between the spokes of a wheel, a lock casing secured to the split collar, and a bolt in said casing adapted to be projected across the outer face of the arm to hold it in vertical position.

5. A device of the character stated, comprising a split collar adapted to be positioned on a steering column, perforated lugs on said collar, a pin having rotary mounting in said lugs, an arm secured to the pin and adapted to be moved into a position between the spokes of a steering wheel, cam blocks on the pin adapted to engage the lugs and contract the collar when the arm is in locking position, a spring secured to the lower end of the arm and engaging the post, and a locking device on one of said lugs adapted to secure the arm in vertical position.

JAMES W. HUNTER.
EDWIN WILLIAMSON.